United States Patent [19]
Roston et al.

[11] Patent Number: 6,068,073
[45] Date of Patent: *May 30, 2000

[54] TRANSFORMABLE MOBILE ROBOT

[75] Inventors: Gerald P. Roston, Whitmore Lake; Eric Endsley, Ypsilanti, both of Mich.

[73] Assignee: Cybernet Systems Corporation, Ann Arbor, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/853,655

[22] Filed: May 9, 1997

Related U.S. Application Data

[60] Provisional application No. 60/017,364, May 10, 1996.
[51] Int. Cl.$^7$ .................................................. B62D 57/028
[52] U.S. Cl. ................................ 180/8.5; 180/8.3; 901/1
[58] Field of Search ............................... 180/8.1, 8.3, 8.5, 180/8.6, 8.4; 901/1

[56] References Cited

U.S. PATENT DOCUMENTS

| | | | |
|---|---|---|---|
| 4,265,326 | 5/1981 | Lauber | 180/8.5 |
| 4,266,627 | 5/1981 | Lauber | 180/8.5 |
| 4,416,344 | 11/1983 | Nakada | 180/8.3 |
| 4,662,465 | 5/1987 | Stewart | 180/8.1 |
| 4,790,400 | 12/1988 | Sheeter | 180/8.6 |
| 4,940,382 | 7/1990 | Castelain et al. | 180/8.5 |
| 5,351,626 | 10/1994 | Yanagisawa | 180/8.6 |
| 5,351,773 | 10/1994 | Yanagisawa | 180/8.5 |
| 5,389,865 | 2/1995 | Jacobus et al. | 318/568.11 |
| 5,459,382 | 10/1995 | Jacobus et al. | 318/568.11 |
| 5,513,716 | 5/1996 | Kumar et al. | 180/8.3 |
| 5,629,594 | 5/1997 | Jacobus et al. | 318/568.11 |
| 5,653,301 | 8/1997 | Andre | 180/8.5 |

*Primary Examiner*—Kevin Hurley
*Attorney, Agent, or Firm*—Gifford, Krass, Groh, Sprinkle, Anderson & Citkowski, PC

[57] ABSTRACT

A versatile robot provides a plurality of different, primary locomotion means and the capability of switching between modes of movement on a rapid basis to traverse a variety of terrains at high speed. In the preferred embodiment, the robot uses a plurality of legs as a first primary means of locomotion and a plurality of wheels as a second, primary means of locomotion. As such, the robot may use the wheels for high speed locomotion (in excess of 10 mph) over prepared surfaces, and the legs for traversing unprepared surfaces and man-made obstacles at lower speed. The system further employs means for monitoring leg or joint position to determine ground contact or obstacles.

17 Claims, 1 Drawing Sheet

TRANSFORMABLE MOBILE ROBOT

REFERENCE TO RELATED APPLICATION

This application claims priority of U.S. provisional application Ser. No. 60/017,364, filed May 10, 1996, the entire contents of which are incorporated herein by reference.

FIELD OF THE INVENTION

This invention relates generally to walking robots and, in particular, to such a robot incorporating selectable primary locomotion means and sensorless detectors for determining ground contact, obstacles, and so forth.

BACKGROUND OF THE INVENTION

The earliest walking robots, built over a decade ago, were the Odetics family of walkers, which used insect-like legs. An early frame walker was the Martin Marietta (now Martin Lockheed) beam walker, which was designed for NASA in 1988 in response to the Mars Rover Sample Return mission. This robot had seven legs driven by ball screws. Three of the legs were on a large, outer frame, and four on a smaller inner frame.

The next frame walker of importance was the Dante robot (both Dante I and Dante II), design at Carnegie-Mellon University (CMU), which had eight non-orthogonal legs, four on each frame. Dante was a large vehicle, in excess of 900 pounds, and was not fully self-contained. The majority of the computing and all of the power sources were off-board. Another CMU frame walker is Daedalus, which was designed as an earth-based prototype of a lunar exploration vehicle. Daedalus is in the form of a hexagon, about 50 inches across and 80 inches tall, and weighs about 450 pounds. This robot was designed to be completely self-contained and employed rack-and-pinion orthogonal legs. Other frame walkers have been built, primarily as student experiments, and others have been proposed, but heretofore none have offered more than one primary means of locomotion.

SUMMARY OF THE INVENTION

This invention resides in a versatile robot configuration providing a plurality of different, primary locomotion means and the capability of switching between modes of movement on a rapid basis to traverse a variety of terrains at high speed. According to the invention, "primary" is defined as independently useful, by itself, as a means of locomotion.

In the preferred embodiment, the robot uses a plurality of legs as a first primary means of locomotion and a plurality of wheels as a second, primary means of locomotion. As such, the robot may use the wheels for high speed locomotion (in excess of 10 mph) over prepared surfaces, and the legs for traversing unprepared surfaces and man-made obstacles at lower speed. The system further employs means for monitoring leg or joint position to determine ground contact or obstacles. In a comprehensive embodiment the robot may further include a prismatic joint having two stages, a pressure drive including dual elastomeric drive wheels to translate the prismatic stages, and a single worm pinion driving two worm wheels in opposite directions.

DETAILED DESCRIPTION OF THE PREFERRED EMBODIMENT

Figure 1:
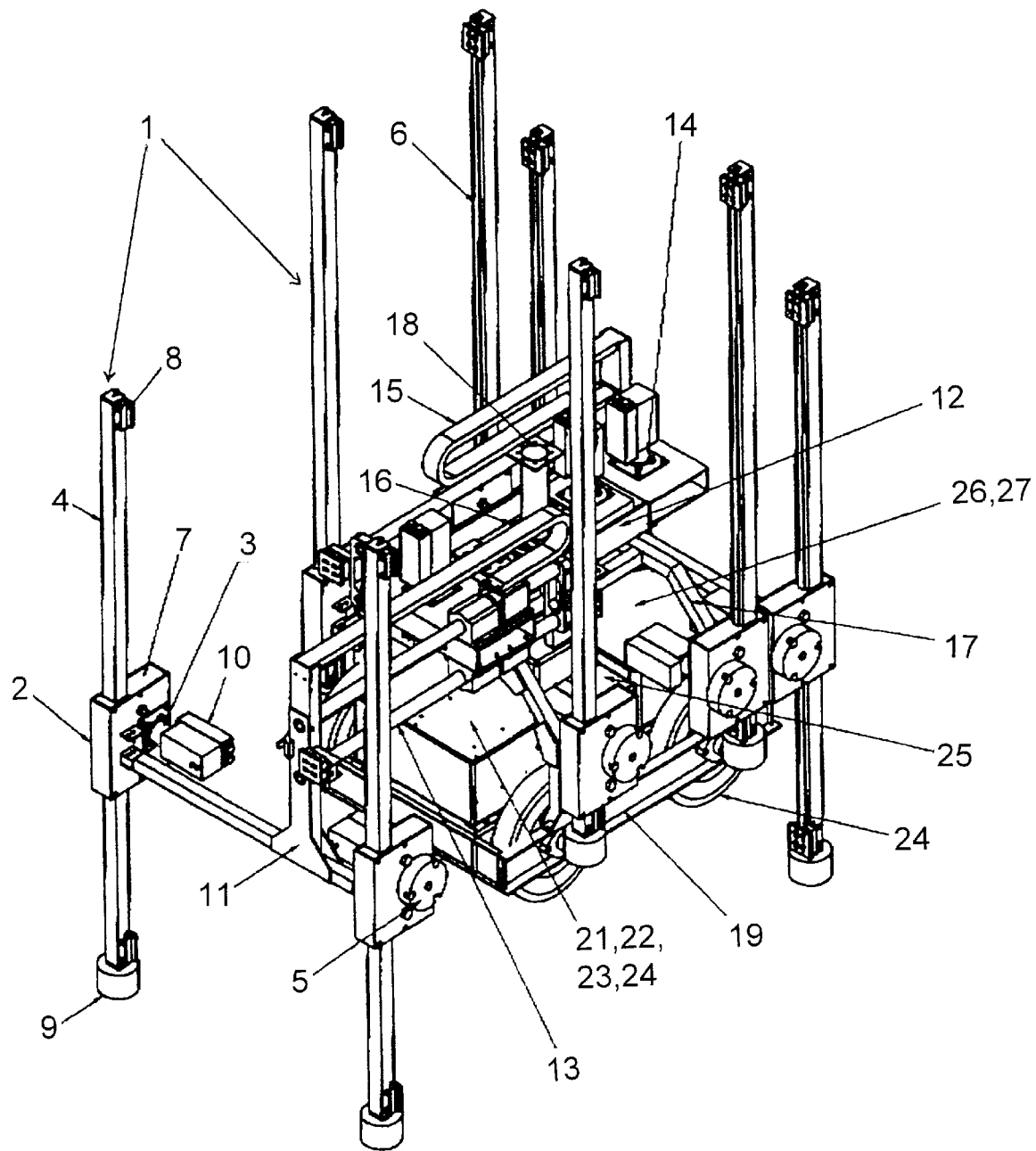
FIG. 1 is a drawing of a robot according to the invention from an oblique perspective.

This invention resides in a versatile robot employing two or more primary means of locomotion in a single vehicle. The means of locomotion may include, but are not limited to, wheels, legs, tracks and wings. The term "dual primary" means that both of the chosen apparatus and methods of locomotion are equally applicable at a given time. To assist with this definition, an example of a vehicle with non-dual locomotive systems is an airplane, since the wheels are used for very limited locomotion.

For high-speed locomotion on prepared and/or smooth surfaces, such as roads, tarmacs, fields and indoors, the inventive robot employs a set of skid-steer wheels. For traversal of rugged terrains and obstacles, such as boulders, rubble fields, stairs, the system employs a plurality of legs (preferably eight such legs) in a frame-walker manner. Both of these locomotion systems are available at any time, and either can be rapidly employed (on the order of seconds) for autonomous reconfiguration.

Making reference to FIG. 1, a walking robot according to the invention preferably includes eight legs (1) which are completely interchangeable, and are fastened to the main body using only three screws. Each leg is driven by a modular vertical drive system (2) which is weather resistant. The vertical drive train (3) consists of a motor and gearhead, timing belt pulley, idler pulleys and timing belt (4). Each leg uses a simple aluminum tube (6) which slides in a square journal bearing (7), and is held in place by a failsafe brake (5). The timing belt is fastened to the leg tube by the belt tensioning mechanism (8). The leg has a rubber foot (9). Each axis is independently actuated, controlled by a distributed intelligent motor controller (10) mounted to each motor.

A preferred configuration includes two sliding horizontal frames (11), which slide relative to the body (12) via linear rails (13). The horizontal drive train (14) consists of a motor and gearhead, timing belt pulley, idler pulleys and timing belt (4). Tracks (15) guide wires between the body and the horizontal frame. A rotational joint (16) allows the body to turn relative chassis structure (17). Above the rotational joint is a payload mounting tray (18). Four of the legs are mounted to the two horizontal frames, and the other four legs are mounted to the chassis structure.

The chassis structure is preferably attached to the chassis (19) using by only eight fasteners. The chassis has four independent direct drive wheels (20) for negotiating prepared surfaces. These wheels are controlled by a four axis controller backplane (21). An on-board computer (22) includes a frame grabber and wireless communication between the on-board computer and the command computer. The entire system is powered by a gasoline generator (25), which is interfaced to a power conversion system (26) and an uninterruptable power supply (27).

In one embodiment the robot also includes a class of sensorless methods for detecting ground contact and/or overtravel with an articulated mechanism. The preferred class of methods includes those which rely on feedback from sensors not specifically designated for determining ground contact or overtravel in the moving joint, including, but not limited to, position sensors, current sensors and inclinometers.

Thus, the system seeks to avoid additional sensors for detecting nominal leg/ground contact and/or overtravel. Instead, during all joint motions including phase of the walking cycle in which a leg is moved into ground contact, the motor current and leg position are monitored. When the current starts to increase rapidly and the rate of change in position decreases, the computer identifies this as being indicative of ground contact or overtravel, as the case may be. This approach facilitates very simple and inexpensive legs.

The invention preferably further includes the use of articulated translation mechanisms for frame walking robots, wherein the robot moves by translating two (or more) frames with respect to each other. All existing frame walkers employ non-articulated frames, resulting in a stroke length and minimum robot length which are the same. By employing articulated frames, each frame may be equipped with a translational motor that allows the frames to move with respect to both the body of the robot and the other frame. Like traditional frame walkers, the stroke distance is constrained by the length of the frame. However, the minimum length of the vehicle is half the frame length, permitting more compact stowage and greater maneuverability.

Certain existing robots permit a small degree of reconfiguration change through the use of exchangeable tools. In a short period of time, i.e., minutes, a robot according to the present invention may be configured as a wheels-only vehicle, a legs-only vehicle or a dual-locomotion vehicle. This easy transformation make the invention applicable to a very wide variety of tasks. In its wheels-only or legs-only configurations, for example, the attach points for the unemployed locomotion chassis can be used for additional payload packages.

Driving prismatic joints on a mobile robot is a technical challenge. The two methods previously employed are a rack-and-pinion drive and a ball-screw drive. Both of these methods are expensive. In addition, the rack-and-pinion system is sensitive to sudden ground contacts, which might cause tooth failure, and the ball screw drive is slow and heavy. Accordingly, this invention preferably employs a novel pressure drive that uses two elastomeric drive wheels to translate the prismatic stages. These drives wheels are driven simultaneously by a single worm pinion that drives two worm wheels in opposite directions, yielding the proper motion. The worm drive employed has the advantages of being inexpensive, lightweight, insensitive to shock and not easily back driven.

The primary reason for employing dual primary locomotion modes is to allow the system to select the locomotion mode that is most appropriate for the type of terrain being negotiated. If the vehicle is being used in a teleoperated mode, the mode switching may be carried out by the operator based on an understanding of the local terrain, which is obtained either by direct observation of the terrain or some combination of direct observation and feedback from sensors aboard the robot. If the vehicle is being used as an autonomous agent, the robot's path planning agent may be used to select the locomotion mode based on the terrain maps generated for the local area and the ability of the locomotion modes to negotiate the local terrain. For example, if the vehicle were initially deployed on a road and was commanded to move off-road, the planning agent either a human in the case of teleoperation or a computer in the case of an autonomous vehicle, may decide to switch to legs if the terrain became sufficiently rugged as to preclude the use of legs in the current locale.

We claim:

1. A terrain-traversing robot, comprising:

a chassis having a front and a rear;

a first set of vertically translatable legs attached to the chassis;

a body rotationally coupled to the chassis about a vertical axis;

a pair of front and rear horizonal frames slidingly attached to the body;

a second set of spaced-apart, vertically translatable legs attached to each horizonal frame; and means for independently controlling each vertically translatable leg between an extended position and a retracted position.

2. The robot of claim 1, wherein both horizontal frames may be slidingly extended beyond the chassis, enabling the body to rotate through any angle relative to the chassis with the second set of legs extended and the first set of legs retracted.

3. The robot of claim 1, further including independent locomotion means attached to the chassis, the independent locomotion means being operative to move the robot with all of the legs retracted.

4. The robot of claim 3, wherein the independent locomotion mean includes a plurality of wheels attached to the front and rear of the chassis.

5. The robot of claim 3, further including means for selecting one of the legs and the independent locomotion means on a rapid, autonomous basis.

6. The robot of claim 1, wherein there are four vertically translatable legs attached to the chassis.

7. The robot of claim 1, wherein there are four vertically translatable legs attached to the body.

8. A terrain-traversing robot, comprising:

a chassis having a front and a rear;

a body rotationally coupled to the chassis about a vertical axis;

a pair of front and rear horizontal frames slidingly attached to the body, each frame having opposing ends;

a plurality of vertically translatable legs forming a first primary means of locomotion, each leg being independently controllable between an extended position and a retracted position, including a first set of legs attached to the chassis and a second set of legs coupled to the body, with one leg being attached to each end of each horizonal frame; and a plurality of wheels attached to the chassis, the wheels forming a second primary means of locomotion.

9. The robot of claim 8, further including means for selecting one of the first and second primary means of locomotion on rapid, autonomous basis.

10. The robot of claim 8, wherein there are four vertically translatable legs attached to the chassis.

11. The robot of claim 8, wherein there are four vertically translatable legs attached to the body.

12. The robot of claim 8, wherein both horizontal frames may be slidingly extended beyond the chassis, enabling the body to rotate through any angle relative to the chassis with the second set of legs extended and the first set of legs retracted.

13. A terrain-traversing robot, comprising:

a chassis having a front and a rear;

a first set of vertically translatable legs attached to the chassis;

a body rotationally coupled to the chassis about a vertical axis;

a pair of front and rear horizonal frames slidingly attached to the body; and a second set of spaced-apart, vertically translatable legs attached to each horizonal frame, and wherein:

each leg is independently controllable between an extended position and a retracted position, and both horizontal frames are slidingly controllable to points beyond the physical extent of the chassis, enabling the robot to walk in any direction by rotating the body through any angle relative to the chassis while extending and retracting the legs in accordance with the terrain.

14. The robot of claim 13, further including a plurality of wheels attached to the front and rear of the chassis, the wheels forming a second primary means of locomotion with all of the legs a retracted.

15. The robot of claim 14, further including means for retracting the legs and operating the wheels on a rapid, autonomous basis.

16. The robot of claim 13, wherein there are four vertically translatable legs attached to the chassis.

17. The robot of claim 13, wherein there are four vertically translatable legs attached to the body.

* * * * *